US008069940B2

(12) United States Patent
Nenno et al.

(10) Patent No.: US 8,069,940 B2
(45) Date of Patent: Dec. 6, 2011

(54) METHOD FOR CONTROLLING POWER FLOW

(75) Inventors: Rudolf Nenno, Villingen-Schwenningen (DE); Juergen Wolf, Frankfurt am Main (DE)

(73) Assignee: Siemens Aktiengesellschaft, München (DE)

( * ) Notice: Subject to any disclaimer, the term of this patent is extended or adjusted under 35 U.S.C. 154(b) by 1363 days.

(21) Appl. No.: 10/568,065

(22) PCT Filed: Jul. 27, 2004

(86) PCT No.: PCT/EP2004/051617
§ 371 (c)(1),
(2), (4) Date: Feb. 13, 2006

(87) PCT Pub. No.: WO2005/025941
PCT Pub. Date: Mar. 24, 2005

(65) Prior Publication Data
US 2006/0287775 A1 Dec. 21, 2006

(30) Foreign Application Priority Data
Sep. 9, 2003 (DE) .................................. 103 41 838

(51) Int. Cl.
*B60K 6/28* (2007.10)

(52) U.S. Cl. .................................. 180/65.21; 180/65.8

(58) Field of Classification Search ................. 180/65.1, 180/65.2, 65.3, 65.4, 65.8, 65.21, 65.24, 180/65.31; 701/22, 23, 25, 26, 1
See application file for complete search history.

(56) References Cited

U.S. PATENT DOCUMENTS

| | | | | |
|---|---|---|---|---|
| 5,416,702 A * | 5/1995 | Kitagawa et al. | ............... | 701/36 |
| 5,426,589 A * | 6/1995 | Kitagawa et al. | ............. | 700/274 |
| 5,487,002 A * | 1/1996 | Diller et al. | ........................ | 701/1 |
| 5,539,399 A | 7/1996 | Takahira | | |
| 5,555,737 A * | 9/1996 | Takeo et al. | ...................... | 62/230 |
| 5,606,243 A * | 2/1997 | Sakai et al. | ................... | 320/134 |
| 5,627,752 A * | 5/1997 | Buck et al. | ....................... | 701/35 |
| 5,734,099 A * | 3/1998 | Saigo et al. | ................. | 73/114.58 |
| 5,757,595 A * | 5/1998 | Ozawa et al. | ............. | 340/636.1 |
| 5,778,326 A * | 7/1998 | Moroto et al. | .................. | 701/22 |
| 5,832,396 A * | 11/1998 | Moroto et al. | .................. | 701/22 |

(Continued)

FOREIGN PATENT DOCUMENTS

DE     43 41 826 C2     6/1994

(Continued)

OTHER PUBLICATIONS

Abstract—EP 1 244 191 A2 Sep. 25, 2002 Leiber, Heinz, 71739 Oberriexingen, Germany.

(Continued)

*Primary Examiner* — Paul N Dickson
*Assistant Examiner* — Bridget Avery
(74) *Attorney, Agent, or Firm* — Cozen O'Connor

(57) ABSTRACT

A method for controlling power sources or energy sinks on an energy accumulator, in particular for a motor vehicle, is disclosed. Conventional systems for power supply to the motor vehicle modules are often excessively used, in particular in utility vehicles when an optimal availability is required. The present method includes measuring parameters characterizing the charge of the accumulator, and transmitting the results of a measurement to a control unit and in generating control signals for the energy sinks or the power sources by a control unit. The method makes it possible to eliminate a frequent cause of a low availability in motor vehicles.

17 Claims, 1 Drawing Sheet

U.S. PATENT DOCUMENTS

| | | | |
|---|---|---|---|
| 6,166,449 A * | 12/2000 | Takaoka et al. | 290/40 B |
| 6,208,931 B1 | 3/2001 | Schoettle | |
| 6,212,198 B1 | 4/2001 | Heck et al. | |
| 6,249,723 B1 * | 6/2001 | Lutz | 701/22 |
| 6,314,347 B1 * | 11/2001 | Kuroda et al. | 701/22 |
| 6,687,607 B2 * | 2/2004 | Graf et al. | 701/202 |
| 6,793,027 B1 * | 9/2004 | Yamada et al. | 180/65.1 |
| 6,856,866 B2 * | 2/2005 | Nakao | 701/22 |
| 6,864,807 B2 * | 3/2005 | Todoriki et al. | 340/988 |
| 7,013,205 B1 * | 3/2006 | Hafner et al. | 701/22 |
| 2003/0006914 A1 | 1/2003 | Todoroki | |
| 2005/0228553 A1 * | 10/2005 | Tryon | 701/22 |

FOREIGN PATENT DOCUMENTS

| | | |
|---|---|---|
| DE | 196 22 529 A1 | 12/1997 |
| DE | 101 23 802 A1 | 12/2002 |
| EP | 1 244 191 A2 | 9/2002 |
| JP | 7085397 | 3/1995 |
| JP | 10070844 | 3/1998 |
| JP | 2001 505847 | 5/2001 |
| JP | 2003 021522 | 1/2003 |
| JP | 2003 095042 | 4/2003 |
| WO | WO 96/11817 A2 | 4/1996 |

OTHER PUBLICATIONS

J.M. Miller et al.; <<Current Status and Future Trends in More Electric Car Power Systems>>; Vehicular Technology Conference; 1999 IEEE 49th Houston TX, USA; May 16-20, 1999; Piscataway, NJ, USA, IEEE, US May 16, 1999 pp. 1380-1384; XP-010342161; ISBN 0-7803-5565-2 The whole document.

Derwent Abstract—DE-43 41 826 C2; Jun. 23, 1994; Volkswagen AG, D-38440 Wolfsburg, Germany.

Derwent Abstract—DE-196 22 529 A1; Dec. 11, 1997; Mannesmann VDO AG, D-60326 Frankfurt, Germany.

Derwent Abstract—DE-101 23 802 A1; Dec. 5, 2002; Audi AG, D-85057 Ingolstadt, Germany.

* cited by examiner

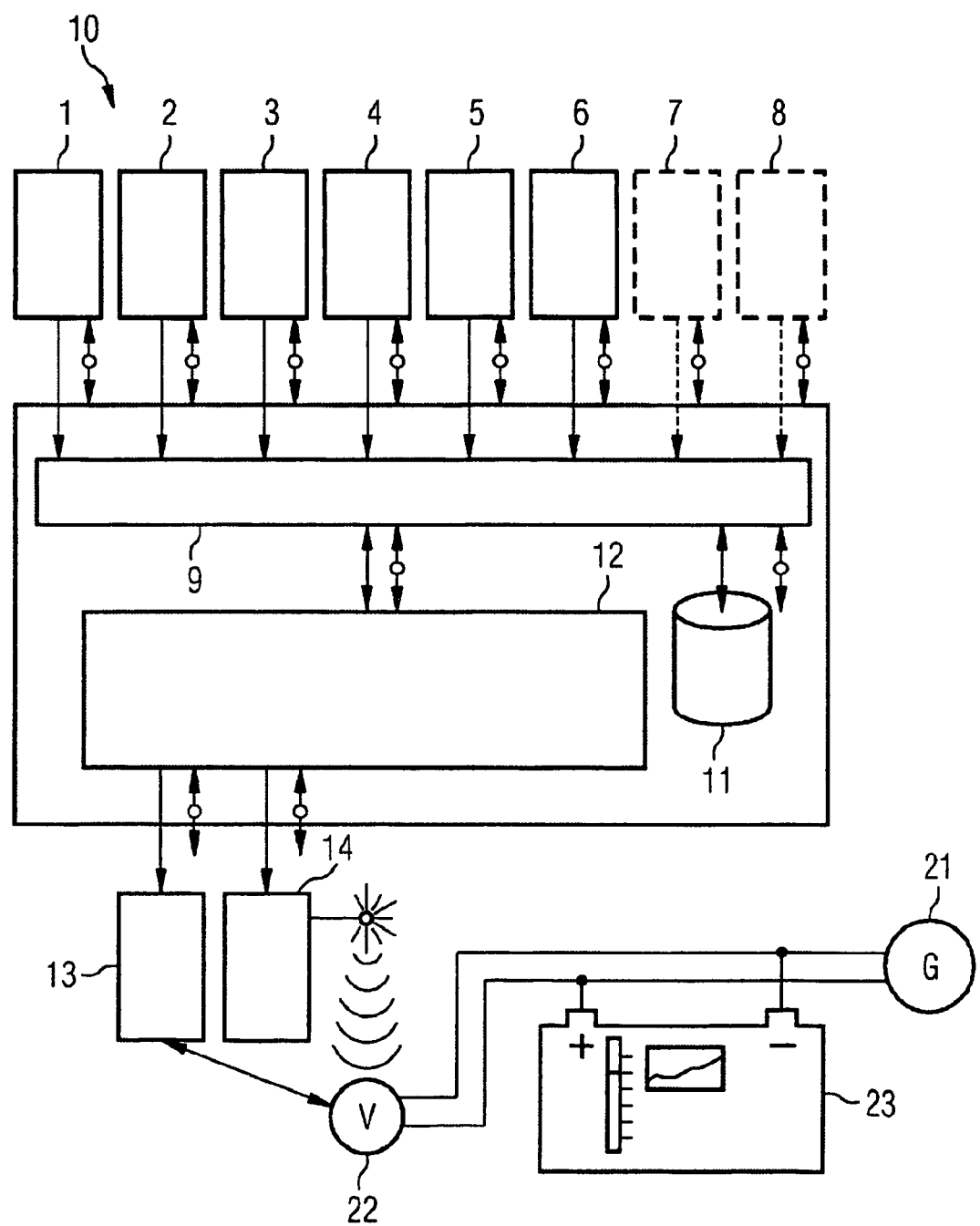

and of claim 9. The

METHOD FOR CONTROLLING POWER FLOW

BACKGROUND OF THE INVENTION

The invention relates to a method for controlling energy sources or energy sinks on an energy accumulator, in particular in a motor vehicle, in which case at least one parameter which characterizes the state of charge of the energy accumulator is measured, in which case the parameter which characterizes the state of charge of the energy accumulator is transmitted to a control unit, in which case the control unit generates at least one control signal as a function of the parameter which is characteristic of the state of charge of the energy accumulator, which control signal controls energy sinks or energy sources which are connected directly or indirectly to the energy accumulator, in terms of the power which they consume from the energy accumulator or the power which they emit to the energy accumulator. An apparatus for carrying out the method is also covered by the subject matter of the invention.

The subject matter of the invention relates mainly to the field of automobile engineering in which case, in consequence, the expressions energy accumulator and battery or vehicle battery are used synonymously.

Electrical couplings or clutches, electrically operated lifting ramps, winch motors, drive-by-wire controllers, steer-by-wire controllers, electrical retarder supports, automotive image identification systems, radar-sensor systems, information system modules for organization of the unloading and loading of commercial vehicle cargoes on fleet parking areas and various further electrically operated systems assist the driver to carry out his tasks. The large number of these electronic information, control and loading systems, the increasing electrification of previously mechanical driving aids and equipment, and the increasing level of motorization with correspondingly larger starting aids require a large amount of electrical energy, and thus have a direct influence on the life of vehicle batteries. In consequence, any shortage in the battery-fed energy supply in vehicles such as these also results in a drastic increase in the risk of breakdown. Vehicles with a high risk of breakdown, in particular commercial vehicles, do not comply with the requirements for a high degree of mobility, and can be used only to a restricted extent.

Various apparatuses and methods for optimization of the state of charge and thus also of the life of vehicle batteries are already known, and are currently used in particular cases in passenger vehicles. By way of example, batteries are equipped with sensors and actuators which readjust their own temperature when cold. In consequence, the chemical reaction rates are increased, and the battery can be recharged within a shorter time. So-called integrated battery diagnosis systems are also known, which are integrated directly in the battery as a small electronic assembly, and lengthen the life of the battery.

However, none of the abovementioned systems overcomes the reason for restrictions to the availability of energy accumulators and the high costs associated with them as a result of their failures.

SUMMARY OF THE INVENTION

Energy management systems for motor vehicles, which monitor the state of charge of a battery on the basis of at least one monitoring parameter for the battery and if required apply measures to loads or energy sources are already known from the International Patent Application WO 96/11817, the publication "Current status and future trends in More electric Car power systems" (J.M. Miller et al., May 16, 1999) and European Patent Application EP 1 244 191 A2. These systems have the common disadvantage that the proposed methods essentially can take account only of the measured state of charge of the battery for the optimization of the energy flows, and that the theoretically possible range of loads for the battery cannot be used.

In this context, the invention is based on the object of specifying a method of the type mentioned initially, which ensures that an energy accumulator, in particular a vehicle battery, is operated in as optimum a fail-safe manner as possible. An apparatus for carrying out the method is also the subject matter of the invention.

According to the invention, the object is achieved by means of the subject matter of the first claim and of claim 9. The respective dependent claims describe advantageous refinements and developments of the solution found.

The state of charge of the battery depends not only on the battery characteristic data but also on a large number of further factors. In addition to the battery characteristic variables, the acid levels of the battery, the load power levels, the charging voltage, the dynamic system characteristics and the nature of the vehicle use also govern the life of the battery, and hence also the risk of the vehicle breaking down.

The central element that is currently implemented in all vehicles for detection of a large number of parameters which are relevant for the state of charge of the battery, such as the vehicle power supply system voltage, the rotation speed, the speed, the temperatures, etc., and for controlling a large number of electrical loads, is the instrumentation unit, in this case referred to for short as the combination instrument. The information flow which coincides here, combined with the capability to control parameters relating to the system-internal power flows, is particularly suitable for integration of the method described in this invention. The present trend for modularization of individual system components in the vehicle and for connection to universal networks, such as CAN, RS485, LON or K-line, is opening up the option not only of further concentration of functionality in the combination instrument, but also of centrally influencing virtually all system components and loads in the vehicle. In addition, connections which are not cable-based, such as Bluetooth, also according to the invention allow the control of components which are not wired in as standard, for example retrofitted components. The central implementation of functionalities in a control unit makes it possible to avoid some of the sensitive electronics, thus improving the reliability and lengthening the life of the overall system.

A further advantage of the invention is the use of criteria which allow adaptation of the method and of its implemented routines to different energy sinks and energy sources, such as different battery types, thus making it possible to ensure use that is as versatile as possible. In addition to automatic control by the system, active, assessing, manual action on the overall system is also possible, thus allowing adaptations to be carried out for different situations and characteristics relevant to the vehicle and the journey profile.

One advantageous development of the invention advantageously uses apparatuses and methods for evaluation and control of driver-relevant, transport-logistic or vehicle-relevant data, with the apparatuses or methods that can be used being, for example, so-called generator regulators, electronic battery heating management systems, temperature sensors for the battery and the engine bay, acid density meters for batteries, sensors and actuators for energy sources and energy sinks, route planners, detectors for detection of system characteristics, systems for controlling ignition and injection systems (engine control), and systems for controlling logistic processes for passenger vehicle and commercial vehicle traffic.

In order to provide further illustration, the most important of the apparatuses and methods mentioned above will be explained or defined briefly in the following text.

Generator regulators compensate for the voltage differences caused by rotation speed and load fluctuations.

Battery heating management systems use a measurement and control unit which is located in the battery housing to determine the temperature of the battery, and to readjust it.

Acid density meters for batteries determine the acid density and acid stratification of the batteries.

Acid regulators compensate for chemically non-uniform states.

Load meters and load controllers for loads in the vehicle determine and control the energy and time profile of continuous loads, long-term loads and short-term loads.

Detectors on the battery detect the interaction of battery, generator, loads, temperature, rotation speed and transmission ratio from the engine to the generator, and transmit a characteristic which describes this system.

Systems for controlling the ignition and injection system or engine management systems, such as motronic systems, detect and control instantaneous engine operating data and communicate with other vehicle controllers.

Systems for controlling individual goods vehicles and goods vehicle fleets, so-called wap-log systems, analyze the processes relating to transport logistics. The company procedures with generally different types of traffic are stored in a database. Depending on the specific application, a relevant model is activated, in which details of the task processes and of the present order are recorded, so that the driver is guided through his journey profile by mobile radio step-by-step by means of an information system which is based on a wireless application protocol, referred to for short as WAP, on the general packet radio service, referred to as GPRS for short.

The battery temperature at which the engine can still be started depends on the minimum state of charge of the battery.

The current emitted from the generator is dependent on the rotation speed. If the load current is greater than the generator current, for example when the engine is idling, the battery is discharged, and the voltage in the vehicle power supply system falls.

The rotation speed which is offered to the generator depends on the use of the vehicle, such as commercial traffic, driving on freeways, driving in towns, etc.

The load power levels are governed by the electrical loads. In a vehicle, these comprise permanent loads (ignition, fuel injection, etc.), long-term loads (lighting, brake light, etc.) and short-term loads (blinkers, brake light, etc.), and they are switched on for different periods. In some cases, they are dependent on the time of year (air-conditioning system, seat heating) or are dependent on the type of driving (cooling fans).

The charging voltage has to vary depending on the chemical processes in the battery. Cold requires a high charging voltage, while heat requires a lower charging voltage.

The interaction of the battery, generator, loads, temperature, rotation speed and transmission ratio from the engine to the generator is described by the system characteristic. This changes dynamically depending on the vehicle operating condition.

The battery acid levels determine the density of the electrolyte, which is provided as the ion conductor between the pole plates, varying with the charging voltage, and can be used as a measure for this. Typical values between a charged battery and a discharged battery fluctuate in the case of low-acid rechargeable batteries ($PbO_2$-$H_2So_4$-Pb) between 1.28 kg/l and 1.04 kg/l.

The maximum power of the generator rises with the rotation speed. In the case of modern vehicles, engine idling represents about one-third of the rotation speed probabilities of the generator. The power emitted from the generator is controlled by means of the field current. The current output function has a curved profile when plotted against the rotation speed. This so-called maximum current characteristic rises from the 0-ampere rotation speed up to the idling rotation speed, but then rises only slightly up to the maximum rotation speed, in order to ensure overload protection.

The systems are controlled by means of a generator regulator, specifically a standard regulator or multifunction regulator. Standard regulators normally have a temperature-dependent preset nominal value, which is higher when it is cold in order to improve battery recharging, which is then more difficult. Modern multifunction regulators have an interface which, within certain limits, allows fine tuning with respect to the engine operating state.

Engine management systems are systems for controlling the ignition and injection system, such as motronic systems, and carry out the detection and control of instantaneous engine operating data, on a microprocessor-controlled basis. They communicate with other vehicle controllers via the CAN bus system. Typical engine operating data includes the accelerator pedal position, the ignition data, the air flows, the rotation speed, the temperatures, the battery voltage, the fuel flow, the speed of travel, the torque, the mixture ratio, the exhaust gas data, etc.

The method according to the invention can advantageously provide for prioritization, filtering and normalization of various data formats to be carried out with the aid of a data mask. This means that the actual core algorithm for generation of control signals for power loads or power feeders remains free of module-specific data format corrections, and is thus clear.

One embodiment of the method according to the invention is particularly expedient when the future time profile of the state of charge of the energy accumulator is signaled to a user, in particular being indicated on a display or signaled acoustically. The vehicle driver of the motor vehicle therefore does not have to blindly trust a system with the method according to the invention and can always reassure himself that the procedure proposed by the method is worthwhile.

The control unit which generates control signals can expediently be connected to actuators by means of which engine parameters can be adapted. By way of example, a controller for an automatic transmission can be matched with respect to the rotation speed behavior on load in such a way that the drive rotation speed for the generator is increased when required. In addition, however, it is also expedient to connect actuators to the control unit which control high-load infotainment elements on a state of charge-dependent basis, for example switching them off when the state of charge is critical. The method according to the invention is additionally optimized if the control unit is able to calculate the energy consumption of energy sinks on the planned route in advance, for example by using data from a navigation system and vehicle-specific characteristic data to produce an appropriate prediction.

It is particularly expedient for the control unit according to the invention to be integrated as a component in a combination instrument. Combination instruments are already a destination point for all the information flows from the motor vehicle system.

One preferred variant of the solution found provides for logic linking and assessment of some of the data obtained by means of the abovementioned apparatuses and methods to be carried out in the combination instrument such that either optionally or automatically on a predetermined basis an energy situation is recommended which has been optimized for the overall system comprising the vehicle, the roadway and the route, or a situation is forced that offers an optimized charging state and final charge state for the energy accumulator or the battery.

The method is advantageously implemented by means of an apparatus according to the invention, which expediently has a control unit that is included in a combination instrument, with the control unit having a remote data transmission module, an engine management module, a battery management module, a temperature module, a data input module, a filter, a memory, a logic module, a wire-free load controller or a wire-based load controller.

BRIEF DESCRIPTION OF THE SEVERAL VIEWS OF THE DRAWINGS

The invention will be explained in more detail in the following text on the basis of one specific exemplary embodiment and with reference to a drawing for illustrative purposes, without any restriction to this example. In the figure:

FIG. 1: shows a system sketch of an apparatus which operates using the method according to the invention.

DETAILED DESCRIPTION OF THE INVENTION

FIG. 1 illustrates the data flows of input and output parameters 1 to 8, with the input and output parameters 1 to 6 being explained in detail in the following text, and the input and output parameters 7 to 8 being described as being representative of further channels which may possibly not always be used.

Essentially, a control unit 10 according to the invention for controlling energy sources 21 or energy sinks 22 on an energy accumulator 23 comprises input and output modules 1 to 8, a filter 9 for matching, standardization and normalization of data formats from or for the input and output modules 1 to 8, a logic module 12, a memory 11, a wire-free load controller 13 and a wire-based load controller 14. All of the abovementioned modules 1 to 14 have a connection which can carry a bidirectional data flow to the connected adjacent module, with the input and output modules 1 to 8 each being connected to the filter 9, with the filter 9 being connected to the memory 11 and to the logic module 12, and with the logic module 12 having a corresponding link to the load controllers 13, 14. The bidirectional data flow is illustrated in FIG. 1 by means of a double-headed arrow which has a centrally arranged circle symbol. A unidirectional call to a module by means of a module connected adjacent to it is in each case symbolized by a single arrow, as well. The input and output modules 1 to 8 call the filter 9, via a bus that is not illustrated, when data or measurement data is present. The filter 9 starts a call or is called by the modules, the logic module 12 and the memory 11. The logic module 12 calls the load controllers 13 or 14 as required.

The energy accumulator 1 is in the form of a passive energy source, specifically a battery. The data to be transmitted to the filter 9 is information from a battery management system, temperatures of the battery and chemical data.

The energy source 2 or the generator 21 which is illustrated in FIG. 1, once again for simplicity purposes, in the connection of the generator 21, energy accumulator 23 and load 22, comprises all of the active energy sources, specifically generators, generator regulators, solar collectors or external electrical power supplies connected to the vehicle.

Data is transmitted from a remote data transmitter 3 to the filter 9 and is used in the method for determination and for adjustment of a driving situation or route which is advantageous for charging and discharging of the battery. The state of charge and the charging time predictions are transmitted to a wap-log system, which transmits an optimized route back to the system according to the invention, on the basis of this data.

An engine management module 4 transmits parameters relating to the ignition system and to the injection system to the filter 9, in particular engine temperatures and the rotation speed. The system uses this data to identify whether the driver or the vehicle controller should initiate a higher rotation speed in order that the generator 21 will produce a higher charging current.

A battery management module 5 supplies the filter 9 with information relating to the electronic battery management, in particular heat management. This essentially comprises the temperature data for the energy accumulator 1, with an operating temperature that is advantageous for the energy accumulator 1 being produced.

A temperature module 6 supplies the control unit 10 according to the invention, via the filter 9, with data relating to the temperatures in the engine bay, temperatures relating to the engine, and external ambient temperatures.

The filter 9 comprises a data mask which prioritizes the data from the modules 1 to 8, adapting and filtering it with respect to the data format. In addition, information is assessed and weighted in advance in the filter 9 relating to its importance for the driver, for the roadway, for the vehicle, for the energy sources and for the energy sinks, in order to achieve a processing time in the logic module 12 that is as short as possible.

Data to be buffer-stored is stored temporarily or permanently in a memory 11, so that it is available at short notice to the program when required.

The information relating to the data mask, with prioritization and filtering 9, and the data from the memory 11 are logically linked and calculated in the logic module 12, so that the results can then be processed further and preprocessed in the module for prioritization and filtering 9.

In the further method procedure, the individual control and measurement units described above, such as a generator regulator, electronic battery heat management systems, temperature sensors for the battery and the engine bay, acid density meters for batteries, sensors and actuators for energy sources and energy sinks, route planners, detectors for detection of system characteristics, systems for controlling the ignition and injection system, and systems for controlling logistic procedures in passenger vehicle and commercial vehicle traffic are instructed via the input and output modules 1 to 6, so that they can then be subjected by means of automatic control or by the driver to manipulation, such as activation, reduction of the rotation speed, connection of a second starter battery, indication of a good route from the energy point of view, heating of the battery, connection or disconnection of further energy sources, dimming of the lighting, load-related control of intelligent headlights, partial disconnection of individual infotainment elements, etc. The module 13 is used to control energy sinks 22 or loads, which are not specified in any more detail, via a wire-free connection, by means of simple status information from the load and simple directives relating to the permissible energy consumption, that is optimum from the energy point of view.

The module 14 controls energy sinks 22 or loads, which are not specified in any more detail, using wires, by the provision of digital on/off control signals.

The exemplary embodiment envisages manipulation of the load-related control of various energy sinks 22 or loads, as will be explained in more detail in the following text for "intelligent headlights". "Intelligent" headlights, which use the advanced front-lighting system (which is currently in experimental use), are also able to supply power to the lamps, by means of a controller. This headlight is connected to the vehicle CAN bus. The intensity and direction of the beam from the front head-light can be controlled specifically by the use of lenses, mirrors or a DMD (digital micromirror device). The power and beam control are controlled in such a way as to achieve an optimum state of charge. In order to avoid adverse effects on driving safety resulting from lack of lighting of the roadway, necessary restrictions can be implemented, for example by reducing the maximum speed, by actions on the engine controller.

The invention claimed is:

1. A method for controlling energy sources or energy sinks on an energy accumulator in a motor vehicle, the method comprising the steps of:
   measuring at least one parameter which characterizes the state of charge of the energy accumulator,
   transmitting the parameter which characterizes the state of charge of the energy accumulator to a control unit,
   prioritizing data from a plurality of modules by a data mask;
   adapting and filtering the data based at least in part on data formats;
   generating by the control unit at least one control signal as a function of the parameter which is characteristic of the state of charge of the energy accumulator, which control signal controls energy sinks or energy sources which are connected directly or indirectly to the energy accumulator, in terms of the power which they consume from the energy accumulator or the power which they emit to the energy accumulator, and
   calculating by the control unit the energy consumption of energy sinks on a planned route in advance, wherein the data is weighted to minimize processing time.

2. The method according to claim 1, wherein the control unit generates the control signal in a manner to control the energy sources or energy sinks, in that the energy accumulator has a positive energy balance in a defined time unit, or a positive power balance.

3. The method according to claim 1, wherein the control calls up at least one of
   measurements;
   characteristic variables of the electrical characteristics of the energy accumulator;
   generator currents;
   acid levels of the energy accumulator;
   the engine rotation speed;
   the engine temperature;
   the energy accumulator temperature;
   the ambient temperature;
   the dynamic system characteristic of the energy accumulator;
   ignition data for engine ignition;
   injection system data;
   data relating to the motronic system;
   data from systems which are related to the motronic system, and/or engine operating data;
   data relating to continuous loads;
   data from long-term loads;
   data from charging voltages;
   GPS data;
   data from route planners;
   data from wap-log systems; and
   data from systems which are related to wap-log systems, and generates the control signal completely or partially as a function of this data.

4. The method according to claim 1, wherein a future time profile of the state of charge of the energy accumulator is signaled to a user, by at least one of on a display and acoustically.

5. The method according to claim 1, wherein the control unit is connected to actuators by means of which engine parameters can be adapted.

6. The method according to claim 1, wherein the control unit is connected to actuators, by means of which the power consumption of infotainment elements or of internal or external vehicle illumination can be controlled.

7. An apparatus for controlling energy sources and energy sinks comprising:
   means for measuring at least one parameter which characterizes the state of charge of the energy accumulator,
   means for transmitting the parameter which characterizes the state of charge of the energy accumulator to a control unit,
   means for generating by the control unit at least one control signal as a function of the parameter which is characteristic of the state of charge of the energy accumulator, which control signal controls energy sinks or energy sources which are connected directly or indirectly to the energy accumulator, in terms of the power which they consume from the energy accumulator or the power which they emit to the energy accumulator.
   a data mask configured to prioritize, filter, and normalize data relating to the energy consumption and energy accumulation;
   weighting means to weight the data with respect to at least one of the energy source or the energy sink to minimize processing time; and
   means for calculating by the control unit the energy consumption of energy sinks on a planned route in advance,
   wherein the control unit is a component of a combination instrument which also comprises a major part of the vehicle instrumentation and the control unit is designed in such a way that it calculates the energy consumption of energy sinks on a planned route in advance, and wherein a data mask carries out prioritization, filtering, and normalization of different data formats.

8. The apparatus according to claim 7, wherein the control unit has a remote data transmission module.

9. The apparatus according to claim 7, wherein the control unit has an engine management module.

10. The apparatus according to claim 7, wherein the control unit has a battery management module.

11. The apparatus according to claim 7, wherein the control unit has a temperature module.

12. The apparatus according to claim 7, wherein the control unit has a data input module.

13. The apparatus according to claim 7, wherein the control unit has a filter.

14. The apparatus according to claim 7, wherein the control unit has a memory.

15. The apparatus according to claim 7, wherein the control unit has a logic module.

16. The apparatus according to claim 7, wherein the control unit has a wire-free load controller.

17. The apparatus according to claim 7, wherein the control unit has a wire-based load controller.

* * * * *